(12) United States Patent
Cancedda et al.

(10) Patent No.: US 7,587,307 B2
(45) Date of Patent: Sep. 8, 2009

(54) METHOD AND APPARATUS FOR EVALUATING MACHINE TRANSLATION QUALITY

(75) Inventors: Nicola Cancedda, Grenoble (FR); Kenji Yamada, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 791 days.

(21) Appl. No.: 10/737,972

(22) Filed: Dec. 18, 2003

(65) Prior Publication Data

US 2005/0137854 A1   Jun. 23, 2005

(51) Int. Cl.
G06F 17/27   (2006.01)
G06F 17/28   (2006.01)

(52) U.S. Cl. .............................. 704/2; 704/9

(58) Field of Classification Search ........... 704/2, 704/9
See application file for complete search history.

(56) References Cited

U.S. PATENT DOCUMENTS

| | | | | |
|---|---|---|---|---|
| 5,140,522 | A * | 8/1992 | Ito et al. ........................ | 704/2 |
| 5,227,971 | A * | 7/1993 | Nakajima et al. .............. | 704/2 |
| 5,301,109 | A * | 4/1994 | Landauer et al. ............... | 704/9 |
| 5,371,807 | A * | 12/1994 | Register et al. ............. | 382/159 |
| 5,406,480 | A * | 4/1995 | Kanno ......................... | 704/10 |
| 5,408,410 | A | 4/1995 | Kaji | |
| 5,477,451 | A | 12/1995 | Brown et al. | |
| 5,608,622 | A * | 3/1997 | Church .......................... | 704/3 |
| 5,619,709 | A * | 4/1997 | Caid et al. .................. | 715/209 |
| 5,991,710 | A | 11/1999 | Papineni et al. | |
| 6,182,026 | B1 | 1/2001 | Tillmann et al. | |
| 6,304,841 | B1 | 10/2001 | Berger et al. | |
| 6,338,057 | B1 * | 1/2002 | Weeks ............................ | 707/3 |
| 6,473,896 | B1 * | 10/2002 | Hicken et al. ............... | 717/132 |
| 6,542,866 | B1 | 4/2003 | Jiang et al. | |
| 6,678,415 | B1 | 1/2004 | Popat et al. | |
| 6,848,080 | B1 | 1/2005 | Lee et al. | |
| 6,996,518 | B2 * | 2/2006 | Jones et al. .................... | 704/8 |
| 7,080,320 | B2 * | 7/2006 | Ono ........................... | 715/264 |
| 2002/0198699 | A1 * | 12/2002 | Greene et al. ................. | 704/2 |
| 2004/0024581 | A1 | 2/2004 | Koehn et al. | |
| 2004/0030551 | A1 | 2/2004 | Marcu et al. | |

OTHER PUBLICATIONS

U.S. Appl. No. 10/321,869 entitled "Method And Apparatus For Measuring Similarity Between Documents", by Nicola Cancedda filed Dec. 18, 2002.

David Haussler, "Convolution Kernels on Discrete Structures", Technical Report USCS-CRL99-10, Department of Computer Science, University of California at Santa Cruz, 1999.

(Continued)

Primary Examiner—Richemond Dorvil
Assistant Examiner—Eric Yen
(74) Attorney, Agent, or Firm—Fay Sharpe LLP (57) ABSTRACT

Quality of machine translation of natural language is determined by computing a sequence kernel that provides a measure of similarity between a first sequence of symbols representing a machine translation in a target natural language and a second sequence of symbols representing a reference translation in the target natural language. The measure of similarity takes into account the existence of non-contiguous subsequences shared by the first sequence of symbols and the second sequence of symbols. When the similarity measure does not meet an acceptable threshold level, the translation model of the machine translator may be adjusted to improve subsequent translations performed by the machine translator.

22 Claims, 5 Drawing Sheets

OTHER PUBLICATIONS

Chris Watkins, "Dynamic Alignment Kernels", Technical Report CSD-TR-98-11, Department of Computer Science, Royal Holloway University of London, 1999.

Nicola Cancedda, Eric Gaussier, Cyril Goutte and Jean-Michel Renders, "Word-Sequence Kernels", Journal of Machine Learning Research, Special Issue on Machine Learning Methods for Text and Images, 3:1059-1082, Feb. 2003.

Kishore Papineni, Salim Roukos, Todd Ward and Wei-Jing Zhu, "Bleu: a Method for Automatic Evaluation of Machine Translation", IBM Research Report RC22176 (W0109-022), Sep. 17, 2001.

C. Saunders, H. Tschach, and J. Shawe-Taylor, "Syllables and Other String Kernel extensions", Proceedings of the Nineteenth International Conference on Machine Learning (ICML '02), 2002.

NIST, "Automatic Evaluation of Machine Translation Quality Using N-gram Co-occurrence Statistics" 2002 (available on the Internet at http://www.nist.gov/).

Huma Lodhi, John Shawe-Taylor, Nello Cristianini, and Christopher J. C. H. Watkins, "Text classification using string kernels", in NeuroCOLT2 Technical Report Series NC-TR-2000-079, 2000.

Huma Lodhi, John Shawe-Taylor, Nello Cristianini, and Christopher J. C. H. Watkins, "Text classification using string kernels", in Advances in Neural Information Processing Systems, pp. 563-569, Cambridge, MA, 2001.

Huma Lodhi, Craig Saunders, John Shawe-Taylor, Nello Cristianini, and Chris Watkins, "text classification using string kernels", in Journal of Machine Learning Research, 2:419-444, Feb. 2002.

E. Hovy et al., "Principles of context-based machine translation evaluation", Journal of Machine Translation, vol. 17, No. 1, pp. 43-75, Mar. 2002.

European Search Report for EPO Counterpart Application No. EP 04 02 9092, Dec. 12, 2006.

R. D. Brown, "Example-Based Machine Translation in the Pangloss System",.

M. Carl, A. Way, "Workshop on Example-Based Machine Translation", MT-Summit VIII, Santiago de Compostela, Spain, Sep. 18-22, 2001.

M. Simard, N. Cancedda, B. Cavestro, M. Dymetman, E. Gaussier, C. Goutte, K. Yamada, "Translating with Non-Continuous Phrases", (English Translation of Traduction Automatique Statistique Avec Des Segments Discontinues) $12^{th}$ Annual Conference on the Automatic Treatment of Natural Language (TALN), pp. 233-242, Dourdan, France, (Jun. 2005).

P.F.Brown, S.A.D.Pietra, V.J.D.Pietra, R.L.Mercer, *The Mathematics of Statistical Machine Translation: Parameter Estimation*, Computational Linguistics, 19(2):263-311, 1993.

C.Goutte, K.Yamada, E.Gaussier, *Aligning Words Using Matrix Factorisation*, Proc. ACL'04, pp. 503-510, (2004).

P.Koehn, *Pharaoh: A Beam Search Decoder for Phrase-Based Statistical Machine Translations Models*, USC Information Science Institute, Dec. 2003.

U.S. Appl. No. 11/315,043, filed Dec. 22, 2005, Cancedda, et al.

U.S. Appl. No. 11/431,393, filed May 10, 2006, Cancedda, et al.

F.J.Och, H.Ney, *A Systematic Comparison of Various Statistical Alignment Models*, Computational Linguistics, 29(1):19-51, Mar. 2003.

F.J.Och, H.Ney, *The Alignment Template Approach to Statistical Machine Translation*, Computational Linguistics, 30(4):417-449, 2004.

C.Tillmann, F.Xia, *A Phrase-Based Unigram Model for Statistical Machine Translation*, Proc. of the HLT-NAACL 2003 Conference, Edmonton, Canada, 2003.

N. Ueffing, F.J.Och, H.Ney, *Generation of Word Graphs in Statistical Machine Translation*, Proc. of the $7^{th}$ Conference on Empirical Methods in Natural Language Processing (EMNLP), pp. 156-163, Philadelphia, 2002.

R.Zens, H.Ney, *Improvements in Phrase-Based Statistical Machine Translation*, Proc. of the Human Language Technology Conference (HLT-NAACL), 2004.

http://en.wikipedia.org/wiki/Poisson_distribution.

C.Chenon, *Vers une meilleure utilisabilite des memoires de traduction fondee sur un alignement sous-phrastique*. These de Doctorat, Universite Joseph Fourier, Octobre, 2005 (Abstract).

D.Chiang, *A Heirarchical Phrase-Based Model For Statistical Machine Translation, Proc. $43^{rd}$* Meeting of the Association for Computational Linguistics (ACL), Ann Harbor, Michigan, Jun. 2005.

B.Efron, C.Morris, *Stein's Paradox in Statistic*, Scientific American, 236, 119-127, 1977.

* cited by examiner

METHOD AND APPARATUS FOR EVALUATING MACHINE TRANSLATION QUALITY

CROSS REFERENCE TO RELATED APPLICATION

Cross-reference is made to U.S. patent application Ser. No. 10/321,869 entitled "Method And Apparatus For Measuring Similarity Between Documents", by Nicola Cancedda, which is assigned to the same assignee as the present invention and incorporated herein by reference.

BACKGROUND OF INVENTION

The present invention relates generally to machine translators for performing translations of natural languages and more particularly to a method and apparatus for evaluating the quality of machine translation of natural languages performed by machine translators.

Efficient and effective development, selection, and/or maintenance of machine translation systems require some quantitative measure for evaluating their performance relative to a reference translation. Such a quantitative measure of machine translation performance may be used either by a system developer for tuning a machine translation system being developed or maintained, by a user that requires some measure of performance for choosing between existing machine translators, or by a machine translation system to self-tune its internal system parameters and thereby improve future translation performance.

An example of a similarity measure frequently used to score translations produced using a machine is the IBM BLEU score (which is described in detail in the publication by Papineni et al., entitled "Bleu: a Method for Automatic Evaluation of Machine Translation", published in IBM Research Report RC22176 (W0109-022), Sep. 17, 2001). The IBM BLEU score is based on counts of contiguous word n-grams common the two sequences of symbols, where one sequence is a target translation and the other sequence is a reference translation.

More specifically, letting "c" be the length (in words) of the machine translation, and letting "r" be the length of the reference translation, a length penalty (LP) may be defined by:

$$LP = \begin{cases} 1 & \text{if: } c > r \\ e^{1-\frac{r}{c}} & \text{otherwise} \end{cases},$$

and the BLEU score is then defined as:

$$BLEU = LP \cdot \prod_{n=1}^{N} p_n^{w_n},$$

where $p_n$ is the n-gram precision and $w_n$ is the n-gram weight, which is usually set to 1/N. The BLUE score provides that n-gram precision equals the fraction of contiguous n-grams in the machine translation that match some n-grams in the reference translation. Intuitively, the BLUE similarity measure is assessed in terms of the number of shared contiguous n-grams of length up to some fixed N between a machine translation and a reference translation. A multiplicative correction factor is applied to penalize short translations.

Notwithstanding existing methods for scoring the quality of machine translations, such as the BLUE score, there continues to exist a need to provide improved measures of machine translation performance. Advantageously with improved measures of machine translation performance (i.e., the accuracy with which the measure reflects the perceived quality of translations a machine translation system produces), machine translation systems may be developed and/or self-tuned to produce translations with improved quality.

SUMMARY OF INVENTION

In accordance with the invention, there is provided a method, apparatus and article of manufacture therefor, for measuring the quality of a machine translation relative to a reference translation by computing a similarity measure known as the "sequence kernel" (also referred to as the "string kernel").

Generally, the sequence kernel is a similarity measure between two sequences of symbols over the same alphabet, where similarity is assessed as the number of occurrences of (possibly noncontiguous) subsequences shared by the two sequences of symbols; the more substrings in common, the greater the measure of similarity between the two sequences of symbols. However, noncontiguous occurrences of substrings are penalized according to the number of gaps they contain. The sequence kernel may be used to evaluate the similarity between different types of sequences of symbols such as sequences of: characters, words, lemmas, or other predefined sets of terms (e.g., speech samples).

In accordance with one aspect of the invention, there is provided a method, system and article of manufacture therefor, for computing machine translation performance. The method includes receiving a sequence of natural language data in a first language. The sequence of natural language data is translated to a second language to define a machine translation of the sequence of natural language data A reference translation of the sequence of natural language data in the second language is received. A sequence kernel is computed that provides a similarity measure between the machine translation and the reference translation. The similarity measure accounts for non-contiguous occurrences of subsequences shared between the machine translation and the reference translation. A signal is output that indicates the similarity measure. In one embodiment, the signal indicates when the similarity measure is below a threshold performance level.

BRIEF DESCRIPTION OF DRAWINGS

These and other aspects of the invention will become apparent from the following description read in conjunction with the accompanying drawings wherein the same reference numerals have been applied to like parts and in which.

DETAILED DESCRIPTION

A. Operating Environment

Figure 1:
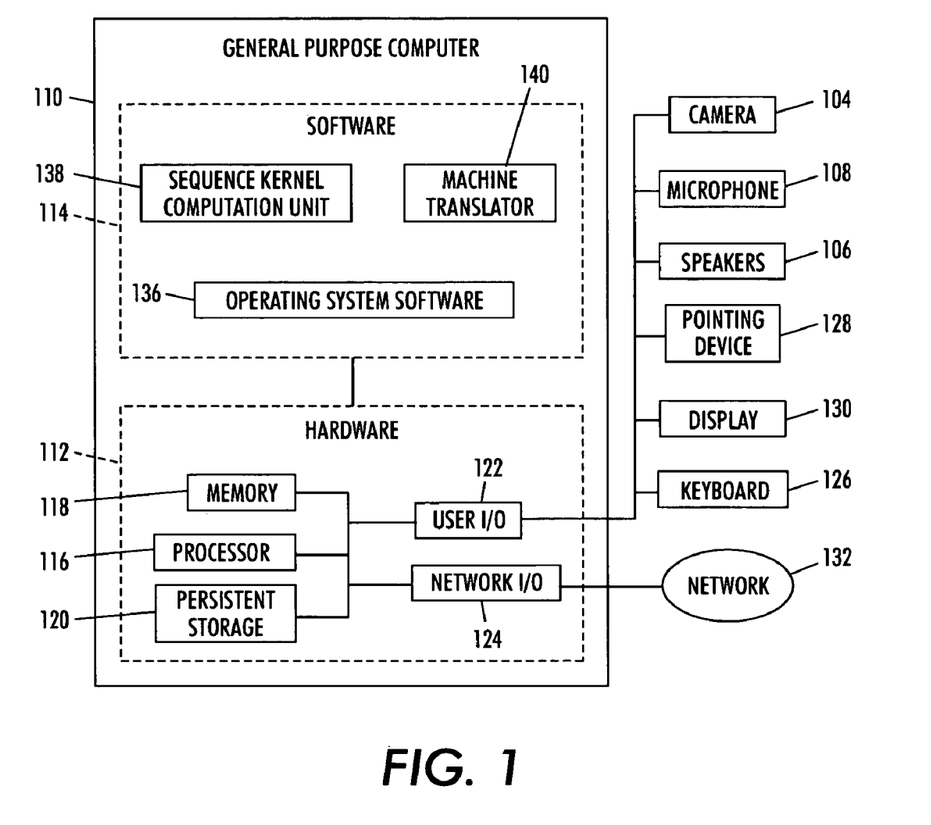
FIG. 1 illustrates a general purpose computer for carrying out the present invention.

FIG. 1 illustrates a general purpose computer 110 for carrying out the present invention. The general purpose computer 110 includes hardware 112 and software 114. The hardware 112 is made up of a processor (i.e., CPU) 116, memory 118 (ROM, RAM, etc.), persistent storage 120 (e.g., CD-ROM, hard drive, floppy drive, tape drive, etc.), user I/O 122, and network I/O 124. The user I/O 122 can include a camera 104, a microphone 108, speakers 106, a keyboard 126, a pointing device 128 (e.g., pointing stick, mouse, etc.), and the display 130. The network I/O 124 may for example be coupled to a network 132 such as the Internet. The software 114 of the general purpose computer 110 includes an operating system 136, a sequence kernel computation unit 138, and a machine translator 140.

Figure 2:
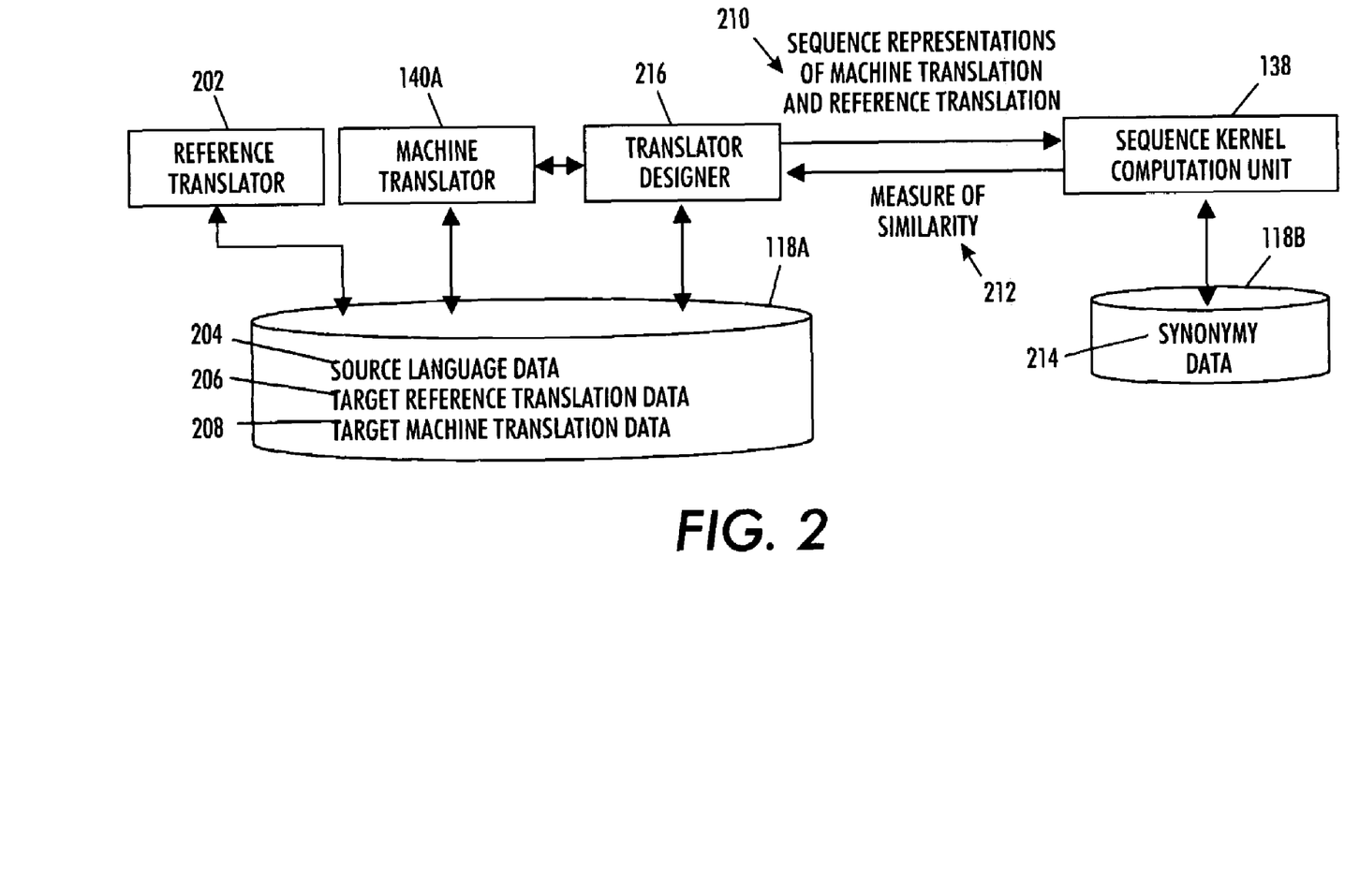
FIGS. 2 and 3 illustrates embodiments in which the machine translator and the sequence kernel computation unit shown in FIG. 1 operate together.
Figure 3:
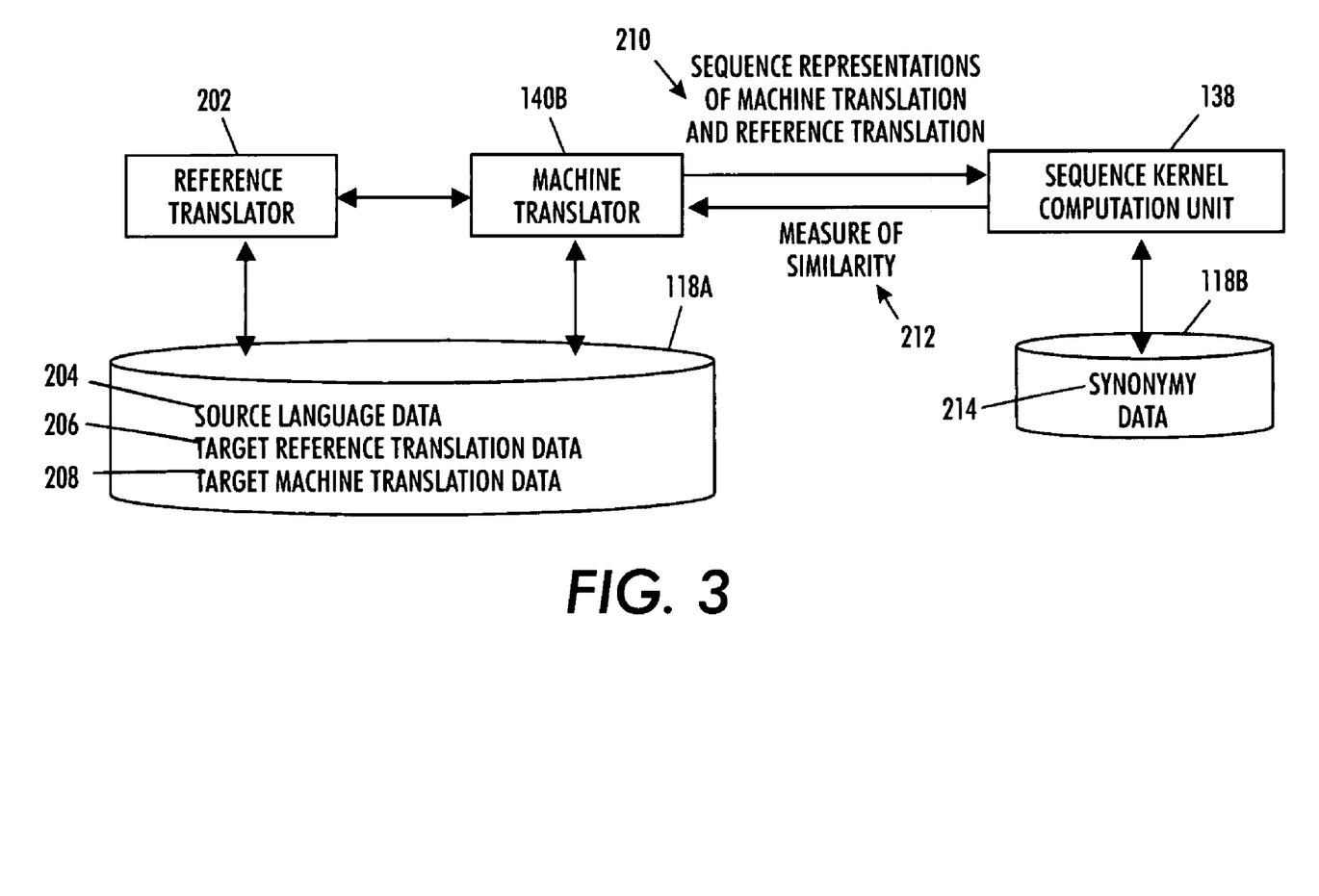

FIGS. 2 and 3 illustrate two different embodiments for obtaining and using a measure of machine translation quality 212 computed by the sequence kernel computation unit 138 using input translation data 210 from the machine translator 140 and a reference translator 202. In either embodiment, the reference translator 202 may be a human translator or alternately another machine translator with proven or consistent performance.

Further in both embodiments, the machine translator 140 and the reference translator 202 take as input, in a first language, source language data 204, and produce as output, in a second language, target machine translation data 208 and target reference translation data 206, respectively. The data 204, 206, and 208 stored in memory 118A in either embodiment is defined by sequences symbols. The symbols may take the form of: characters, words, lemmas, or other predefined sets of terms (e.g., speech samples).

In computing the measure of similarity 212 using processor 116, the sequence kernel computation unit 138 may access synonymy data 214 stored in memory 118B, as discussed in more detail below in section B.3. In one specific embodiment, the synonymy data 214 is a list or collection of synonyms (i.e., words or expressions in the same natural language that have the same or nearly the same meaning). More generally, the synonymy data 214 is a list or collection of symbols in the same natural language that have the same or nearly the same meaning. For example, the language data 206 and 208 stored in memory 118A has corresponding synonymy data 214 stored in memory 118B.

In the embodiment shown in FIG. 2, a translator designer 216 provides sequence representations of machine translation and reference translation data 210 to the sequence kernel computation unit 138. Upon receipt of the measure of similarity 212 from the sequence kernel computation unit 130, the translator designer 216 makes adjustments to operating parameters of the machine translator 140A to improve its translation performance when the measure of similarity 212 falls below a predetermined threshold level.

Figure 4:
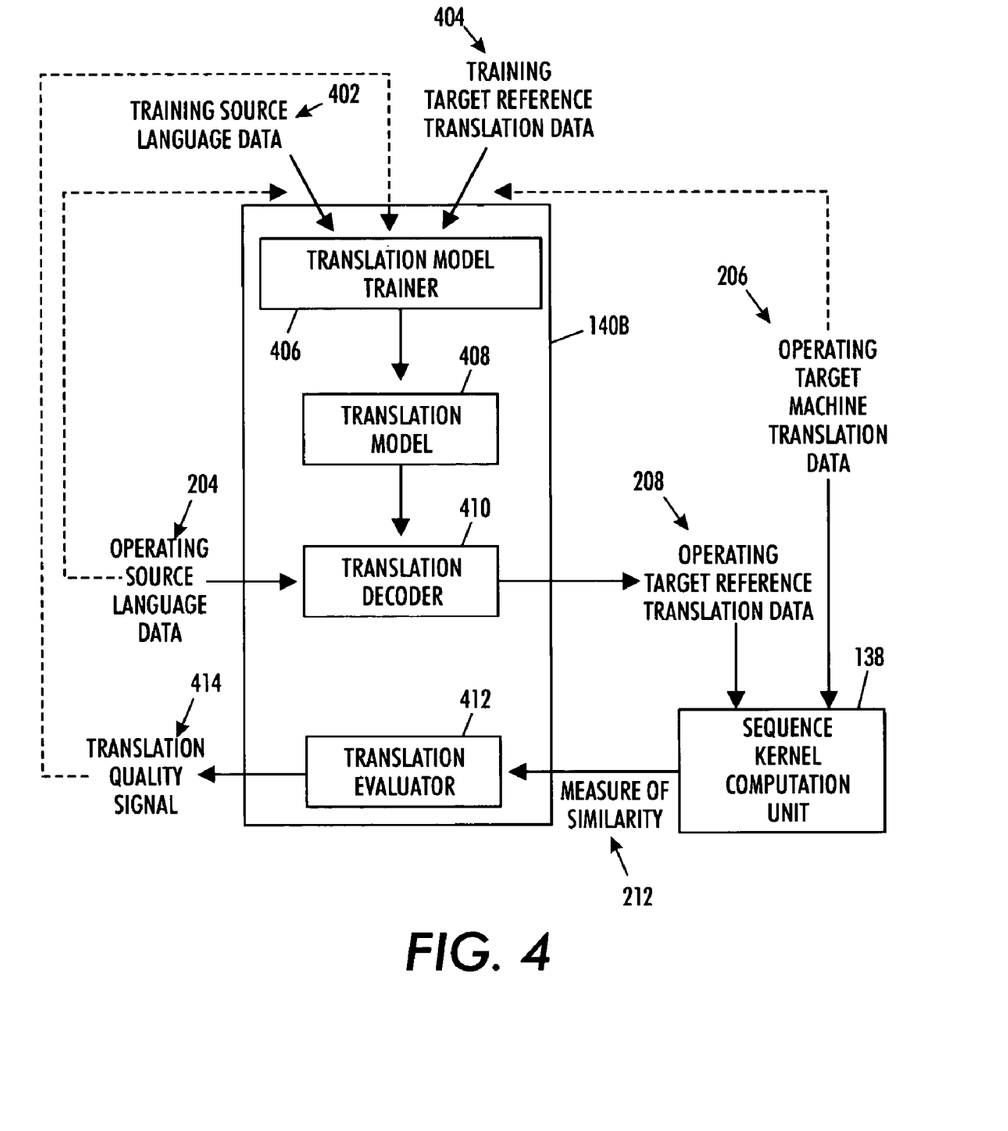
FIG. 4 illustrates further details of the machine translator shown in FIG. 3.

Generally, the machine translator 140B shown in FIG. 3 operates using any "trainable" translation system known in the art. Two examples of trainable translation systems known in the art are statistical translation systems (for which model parameters are statistically obtained from training data) and rule-based translation systems with adjustable parameters (such as dictionary weighting parameters). In the embodiment shown in FIG. 3, the machine translator 140B embodies a trainable natural language translation system that is adapted to iteratively improve its translation performance. The machine translator 140B provides the input translation data 210 as input to, and receives as output the measure of similarity 212 from, the sequence kernel computation unit 138. Further details illustrating how the machine translator 140B in FIG. 3 operates are shown in FIG. 4. In addition, FIG. 5 sets forth a general flow diagram of a method for using the measure of similarity computed by the sequence kernel computation unit to improve performance of the machine translator 140B shown in FIGS. 3 and 4.

The machine translator 140B in FIG. 4 is adapted to train a translation model 408 using a translational model trainer 406 that takes as input, training source language data 402 (in a first language) and training target reference translation data 404 (in a second language). Once the translation model 406 is developed, a translation decoder 410 is adapted to receive operating source language data 204 in the first language for translation to the second language (as set forth generally at 502 in FIG. 5). Subsequently, the operating source language data 204 is transformed into an acceptable form for processing by the translation decoder 410, such as text (as set forth generally at 504 in FIG. 5). For example, transformation of the operating source language data 204 may require transforming audio data to text or image data to text, using well known voice-to-text transformation technology and optical character recognition technology.

Figure 5:
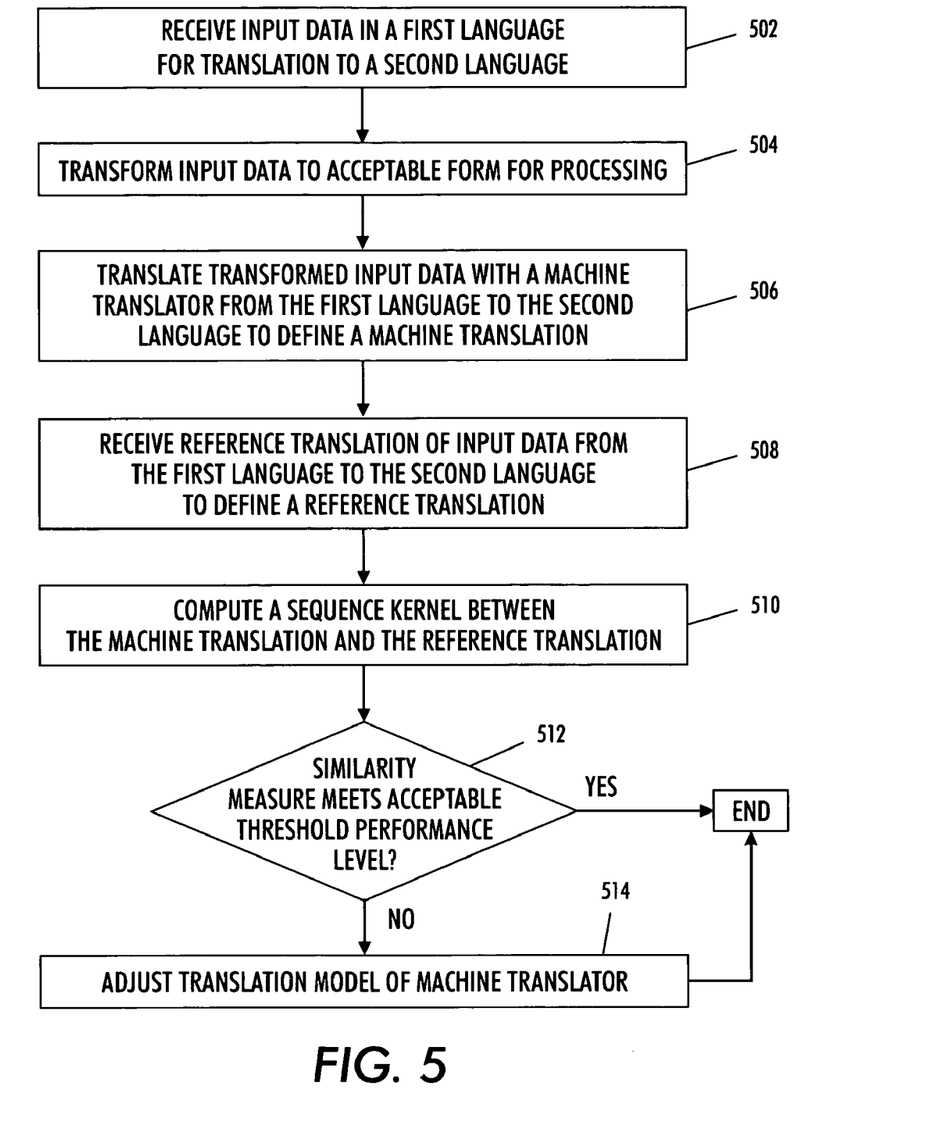
FIG. 5 is a general flow diagram setting forth a method for using the measure of similarity computed by the sequence kernel computation unit to improve performance of the machine translator shown in FIGS. 3 and 4.

In operation, the translation decoder 410 translates operating source language data 204, which is in the first language, to produce operating target machine translation data 208, which is in the second language (as set forth generally at 506 in FIG. 5). Operating target reference translation data 206, which is produced by the reference translator 202 (which is shown in FIG. 3 and set forth generally at 508 in FIG. 5), and the operating target machine translation data 208 are input to the sequence kernel computation unit 138 to compute the measure of similarity 212 (as set forth at 510 in FIG. 5).

As shown in FIG. 4, a translation evaluator 412 outputs a translation quality signal 414 to indicate the similarity measure. In one embodiment, the signal 414 indicates that when the translation quality is below a predetermined threshold performance level (as set forth generally at 512 in FIG. 5). Upon receipt of the single 414 indicating that the similarity measure is below the predetermined threshold performance level, the translation model trainer 406 adjusts the translation model 408 using the operating source language data 204 and the operating target reference translation data 206 to improve its overall performance by considering additional training data (as set forth at 514 in FIG. 5).

In alternate embodiments, the machine translator 140 and the sequence kernel computation unit 138 are embedded together in one or more software modules. In yet other embodiments, the machine translator 140 operates on the general purpose computer 110 that transmits the measure of similarity 214 over the network 132 to another general purpose computer, also coupled to the network 132, on which the machine translator 140 operates.

B. Sequence Kernel Translation Quality Computation

The sequence kernel computation unit 138 computes a sequence kernel for sequence data 216, which is in a similar natural language, that is made up of a first sequence of reference translation data 206 and a second sequence of machine translation data 208. The sequence kernel computes a measure of similarity 214 between the reference translation data and the machine translation data to provide a quantitative measure of the performance of the machine translator, 140. The sequence kernel computes similarity as the number of occurrences of subsequences, which may be non-contiguous, shared between the first sequence of symbols 206 and the second sequence of symbols 208. The greater the degree of similarity (indicated by the measure of similarity) between the two sequences of symbols the closer the machine translation is relative to the reference translation.

As discussed in section B.1 below, the sequence kernel accounts for and penalizes the occurrence of non-contiguous subsequences shared between the first sequence of symbols 206 and the second sequence of symbols 208. In addition as discussed in section B.2 below, the sequence kernel may score (i.e., assign different weights to) symbols shared (i.e., matching) between the first sequence of symbols 206 and the second sequence of symbols 208 different from non-shared (i.e., non-matching) symbols that appear in gaps. Also as discussed below in section B.2, the sequence kernel may score (i.e., assign different weights to) non-contiguous subsequences (i.e., subsequences with gaps) shared between the first sequence of symbols 206 and the second sequence of symbols 208 differently depending on the (identify of) symbols in the matching subsequences and the non-matching symbols that appear in the gaps. Further as discussed in section B.3 below, synonymy data 214 (shown in FIGS. 2 and 3) may be used when computing the sequence kernel to allow approximate (or soft) matches to be recognized between subsequences shared between the first sequence of symbols 206 and the second sequence of symbols 208, as opposed to requiring "hard" or absolute matches to occur before a match is realized.

B.1 Mathematical Framework

This section sets forth basic notations and definitions for the mathematical framework of the sequence kernel that is used to compute a measure of similarity between the sequences of symbols s (e.g., target reference translation data 206) and t (e.g., target machine translation data 208). The notation set forth in this section is also used to describe extensions disclosed below in sections B.2 and B.3.

More specifically, let $\Sigma$ be a finite alphabet, and let $s = s_1 s_2 \ldots s_{|s|}$ be a sequence of symbols over such alphabet (i.e., $s_i \in \Sigma$, $1 \leq i \leq |s|$). Further, let $i = [i_1, i_2, \ldots, i_n]$, with $1 \leq i_1 < i_2 < \ldots < i_n \leq |s|$, be a subset of the indices in s, where $s[i] \in \Sigma^n$ identifies the contiguous or noncontiguous subsequence $s_{i_1}, s_{i_2}, \ldots, s_{i_n}$ of symbols. Also, let l(i) be the value $i_n - i_1 + 1$ (i.e., the length of the window in s spanned by s[i]). The symbols making up the alphabet $\Sigma$ may be any one of the following: (a) a set of characters in a language alphabet; (b) a set of syllables in a language; (c) a set of words; or (d) a set of word stems. In alternate embodiments, the set of words may be given by a set of characters, a set of shapes, or a set of audio samples.

Computing a sequence kernel amounts to performing an inner product in a feature space of all possible subsequences of length n, with one dimension for each subsequence $u \in \Sigma^n$, where the value associated with the feature u (or feature mapping) is defined by:

$$\phi_u(s) = \sum_{i:u=s[i]} \lambda^{l(i)},$$

where $\lambda$ is a real number between zero and one indicating the decay factor for each gap in subsequence occurrences. The decay factor $\lambda$ is used to penalize matching noncontiguous subsequences in the sequences of symbols s and t. If the decay factor $\lambda$ is given the value one then noncontiguous subsequences with gaps between matching symbols in the sequences of symbols s and t are not penalized when the value of the similarity is computed. However, if $\lambda$ is given the value between zero and one (e.g., 0.5), then gap symbols (i.e., symbols in noncontiguous subsequences that create gaps between matching symbols) contribute to the value of the similarity by dividing the contribution of the match they appear in each by $1/\lambda$ (e.g., by two).

The sequence kernel (i.e., similarity $K_n$ where subsequence length n is a fixed positive integer given over the range $n \geq 2$ and the decay factor is given over the range $0 < \lambda \leq 1$) of two sequences of symbols s and t over the finite alphabet $\Sigma$ is defined as:

$$K_n(s,t) = \sum_{u \in \Sigma^n} \phi_u(s) \cdot \phi_u(t) = \qquad [1]$$

$$\sum_{u \in \Sigma^n} \sum_{i:u=s[i]} \lambda^{l(i)} \sum_{i:u=s[i]} \lambda^{l(j)} = \sum_{u \in \Sigma^n} \sum_{i:u=s[i]} \sum_{j:u=s[j]} \lambda^{l(i)+l(j)}$$

In one embodiment, the sequence kernel given in equation [1] is computed using a recursive formulation as disclosed in U.S. patent application Ser. No. 10/321,869 entitled "Method And Apparatus For Measuring Similarity Between Documents", by Nicola Cancedda, which is incorporated herein by reference.

Further details of the sequence kernel is disclosed in the following publications, which are all incorporated herein by reference, by: Chris Watkins, in "Dynamic Alignment Kernels", Technical Report CSD-TR-98-11, Department of Computer Science, Royal Holloway University of London, 1999; Huma Lodhi, Nello Cristianini, John Shawe-Taylor and Chris Watkins, in "Text Classification Using String Kernels", Advances in Neural Information Processing Systems 13, the MIT Press, pp. 563-569, 2001; and Huma Lodhi, Craig Saunders, John Shawe-Taylor, Nello Cristianini, Chris Watkins, in "Text classification using string kernels", Journal of Machine Learning Research, 2:419-444, 2002.

Intuitively, the computation of the sequence kernel given in equation [1] involves the matching of all possible subsequences of "n" symbols in length, with each matching occurrence "discounted" according to the size of the window that it spans (i.e., its gaps). Consider for example the alphabet given by:

$\Sigma = \{$"the", "big", "black", "dog"$\}$, and the two elementary sequences given by:
s="the big black dog" (i.e., reference translation), and
t="the black big dog" (i.e., machine translation).

In this example, the similarity between the sequence s and t is measured for all subsequences (or features) of length n=3. The nonzero subsequences u of the vectors for s and t in the feature space would then be given as set forth in Table 1.

TABLE 1

| u | s | t |
|---|---|---|
| the big black | $\lambda^3$ | 0 |
| the big dog | $\lambda^4$ | $\lambda^4$ |
| the black dog | $\lambda^4$ | $\lambda^4$ |
| big black dog | $\lambda^3$ | 0 |

As shown in Table 1, the only subsequences for which both sequence s and t have a non-null value are "the big dog" and "the black dog". For example, the value of the feature u="the big dog" for sequence t="the big black dog" is $\lambda^4$ because there is one occurrence of the subsequence "the big dog" in sequence "the big black dog". The one occurrence of the subsequence "the big dog" spans a window of width four (i.e., first, second, and fourth symbols). That is, the subsequence "the big dog" spans the sequence "the big black dog" with a gap of one symbol (i.e., "black"). The similarity score $K_3$ is then obtained by multiplying the corresponding components of the subsequences in the two sequence s and t and then summing the result, as given by:

$K_3(\text{"the big black dog"}, \text{"the black big dog"}) = \lambda^4 \lambda^4 + \lambda^4 \lambda^4 = 2\lambda^8$, where $\lambda$ is assigned a value between zero and one (i.e., $0 < \lambda \leq 1$).

By way of another example, assume the machine translator 140 translates the French noun phrase "le gros chien noir" (i.e., source language data 204) to English as "the black big dog" to define target machine translation data 208, whereas the reference translation (e.g., produced by a human) is "the big black dog" to define target reference translation data 206. If only contiguous bigrams are considered when computing the sequence kernel, then the similarity between the two sequences of data 208 and 206 will be zero and the machine translation will be scored as being incorrect. However, if the sequence kernel is used instead to compute the measure of similarity between the two sequences of data 208 and 206, then the machine translation will be given a positive similarity score because it takes into account the following matching n-grams subsequences, of length n=2, that may be non-contiguous: "the+black", "the+big", "the+dog", "big+dog", and "black+dog". Advantageously, the machine translator receives scores from the sequence kernel computation unit that account for non-contiguous subsequences that more accurately reflect how proximate the machine translation is relative to the reference translation.

B.2 Symbol-Dependent Decay Factors

This section sets for an extension to the formulation of the sequence kernel set forth in section B.1. The equation [1], given in section B.1, sets forth a formulation of the sequence kernel, in which all symbols in the finite alphabet $\Sigma$ are treated similarly. In alternate formulations of the sequence kernel, the measure of similarity accounts for symbols differently (i.e., assigns different weights to symbols) in the finite alphabet $\Sigma$ that match or do not match in subsequences and/or that match inside subsequence gaps. That is, in such alternate formulations, the sequence kernel has a discount factor adapted to weight symbols in the finite alphabet $\Sigma$ differently depending on whether: (a) a given symbol is matched (or is present in a gap) as opposed to any other symbol in the finite alphabet $\Sigma$, and/or (b) a same symbol is either matched as part of a subsequence or is present in the gap of a matching subsequence. Such symbol-dependent formulations may be given by the sequence kernel (i.e., similarity $K_n$ where subsequence length n is a fixed positive integer greater than or equal to two, i.e., $n \geq 2$) of two sequences of symbols s and t over the finite alphabet $\Sigma$, as:

$$K_n(s,t) = \sum_{u \in \Sigma^n} \sum_{i:u=s[i]} \sum_{j:u=t[j]} \prod_{1 \leq j \leq |u|} \lambda_{m,u_j}^2 \prod_{i_1 < k < i_n, k \notin i} \lambda_{g,s_k} \prod_{j_1 < l < j_n, l \notin j} \lambda_{g,t_l} \quad [2]$$

where $0 < \lambda_{m,\sigma} \leq 1$ and $0 < \lambda_{g,\sigma} \leq 1$, $\sigma \in \Sigma$.

The equation [2] sets forth two independent decay factors (i.e., $\lambda_m$ and $\lambda_g$) for each symbol in the finite alphabet $\Sigma$. One decay factor concerns the case in which the symbol is matched in the two sequences (i.e., $\lambda_m$), and the other decay factor concerns the case in which the symbol is part of a gap (i.e., $\lambda_g$) in a matching subsequence. Further details related to equation [2] are disclosed by Nicola Cancedda et al., in the publication entitled "Word-Sequence Kernels", published in Journal of Machine Learning Research, Special Issue on Machine Learning Methods for Text and Images, Volume 3: pages 1059-1082, February, 2003, which is incorporated herein by reference.

Advantageously, the equation [2] may be used to compute a measure of similarity 212 between the target reference translation data 206 and the target machine translation data 208 that attaches a different importance in the similarity score depending on the type of incorrect translation of symbols in a matching subsequence. For example, the equation [2] may be used to assign a different score when a noun of a subsequence is incorrectly translated as opposed to when an adjective or an adverb in the subsequence is incorrectly translated.

More specifically, the advantages of the formulation of the sequence kernel set forth in equation [2] with symbol-dependent decay factors can be appreciated by considering the following example. Assume that two different machine translators 140 produce, respectively, the following machine translation data: "a big black dog", and "the big black sheep". According to the formulation given by sequence kernel in equation [1], the two translations may be determined to be equally good when compared to the reference translation given by "the big black dog". In contrast, symbol-dependent decay factors in the sequence kernel given in equation [2] may be used to penalize translation mistakes concerning nouns (e.g., "dog" versus "sheep"), for instance, more severely than making translation mistakes on articles (e.g., "a" versus "the"), so that the machine translation "a big black dog" would be considered a better translation than the machine translation "the big black sheep" relative to the reference translation "the big black dog".

An additional advantage of the formulation set forth in this section and given by equation [2] may be illustrated in the following example. Assume that two different machine translators 140 produce, respectively, the following machine translation data: "the big black dog", and "the big saw dog". According to the formulation given by sequence kernel in equation [1], the two translations may be determined to be equally good when compared to the reference translation given by "the big dog". If the formulation of the sequence kernel set forth in equation [2] is used that penalizes adjectives in gaps less than verbs to compute the measure of similarity between the two sequences of data 208 and 206, then the machine translation will take into account symbols in gaps of the following matching non-contiguous subsequence of length n=3: " the+big+dog". Thus, the machine translation "a big black dog" using this formulation would be considered a better translation than the machine translation "the big saw dog" relative to the reference translation "the big dog". Advantageously, symbol-dependent decay factors in the sequence kernel given in equation [2] may be used to penalize translation mistakes with incorrectly (or non-) specified symbols in gaps of subsequences.

B.3 Soft Matching

This section sets forth a further extension to the formulations of the sequence kernel set forth in sections B.1 and B.2. The formulation given in this section enables "soft matching" between symbol pairs, unlike the "hard matching" formulations of the sequence kernel given by equation [1] in section B.1 above or of the symbol-dependent decay formulation given by equation [2] in section B.2 above. In the "hard-matching" formulations of the sequence kernels described above, either two symbols are equal, and hence a match is scored, or they are different, and hence no match is scored.

In contrast, in "soft matching" formulations of the sequence kernel, subsequences of symbols are scored separately for every pair of symbols in the subsequences. The formulation for the sequence kernel with soft matching in the case of distinct decay factors for matches and gaps (as set forth in equation [2]) is given by:

$$K_n(s,t) = \sum_{u \in \Sigma^n} \sum_{v \in \Sigma^n} \sum_{i:u=s[i]} \sum_{j:v=t[j]} \lambda_m^{2n} \prod_{k=1,\ldots,n} a_{u_k v_k} \prod_{i_1 < l < i_n, l \notin i} \lambda_{g,s_l} \prod_{j_1 < p < j_n, p \notin j} \lambda_{g,t_p} \quad [3]$$

where $0 < \lambda_m \leq 1$ and $0 < \lambda_{g,\sigma} \leq 1$, $\sigma \in \Sigma$, and $0 < a_{\sigma_1 \sigma_2} \leq 1, \sigma_1, \sigma_2 \in \Sigma,$ and where $n \geq 2$ and $a_{xy}$ is the similarity between the two symbols $x, y \in \Sigma$. Further details related to equation [3] are disclosed by Nicola Cancedda et al., in the publication entitled "Word-Sequence Kernels", published in Journal of Machine Learning Research, Special Issue on Machine Learning Methods for Text and Images, Volume 3: pages 1059-1082, February, 2003, which is incorporated herein by reference. Yet additional details of soft matching is disclosed by Saunders et al., entitled "Syllables and Other String Kernel extensions" in Proceedings of the Nineteenth International Conference on Machine Learning, 2002, which is incorporated herein by reference.

By way of example, given the two sequences of symbols "big pig" and "big pork", with the subsequence length equal to two, then a hard matching sequence kernel would produce a measure of similarity that is null. However, in this example, a soft matching measure of similarity is dependent on similarity values assigned to "pig" and "pork". In one embodiment, such similarity values are stored in synonymy data 214 shown in FIGS. 2 and 3. Accordingly, soft matching sequence kernels consider synonymy data of non-matching symbols when computing the measure of similarity 212.

Accordingly, the use of soft matching further improves the correspondence between the computed score and the perceived quality of the machine translation. The formulations above in sections B.1 and B.2 would rate equally the quality of the English machine translation data "the big black canid" and "the big black wolf" of the French source data "le gros chien noir". However, when soft matching is used in this example, the scoring system is provided with synonymy data 214 that indicates "canid" (i.e., meaning any of a family of animals that includes wolves, jackals, foxes, coyote, and dogs) is a closer translation of "dog" than "wolf". Advantageously, the word-sequence kernel adapted to use soft matching of subsequences of symbols may thus be adapted to provide a higher score for translations that are not exactly correct but have some degree of correctness.

B.4 Length Penalty

This section sets forth a length penalty that may be applied to the formulations of the sequence kernel $K_n(s,t)$ set forth in sections B.1, B.2, and B.3. In one embodiment, the length penalty is given by the length penalty (LP) defined in the BLUE score, and which is given by:

$$LP = \begin{cases} 1 & \text{if: } c > r \\ e^{1-\frac{r}{c}} & \text{otherwise} \end{cases}, \quad [4]$$

where "c" and "r" are the length (in symbols) of the machine translation and the reference translation, respectively.

In one formulation, the length penalty given by equation [4] may be applied to the sequence kernels $K_n(x,y)$, which are set forth in sections B.1, B.2, and B.3, to yield the sequence kernels $K'_n(x,y)$ with a length penalty for one subsequence length n given by:

$$K'_n(x,y) = LP \cdot K_n(x,y).$$

In another formulation, the length penalty given by equation [4] may be applied to the sequence kernels $K_n(x,y)$, which are set forth in sections B.1, B.2, and B.3, over a range of subsequence length to yield the sequence kernels $K''_n(x,y)$ with a length penalty over a range of subsequence lengths n given by:

$$K''_n(x, y) = LP \cdot \prod_{n=M}^{N} K_n(x, y),$$

where the subsequence length n is defined over the range where $M \geq 1$ and $N \geq M$.

C. Miscellaneous

The use of the terms "string" and "sequence of symbols" are used interchangeably herein to specify a concatenation of symbols (or symbol data). The symbols in a sequence of symbols may encode any set of terms including but not limited to: alphanumeric characters (e.g., alphabetic letters, numbers), symbols, words, lemmas, music notes or scores, speech samples, biological or chemical formulations (e.g., amino acids or DNA bases), and kanji characters.

Using the foregoing specification, the invention may be implemented as a machine (or system), process (or method), or article of manufacture by using standard programming and/or engineering techniques to produce programming software, firmware, hardware, or any combination thereof. It will be appreciated by those skilled in the art that the flow diagrams described in the specification are meant to provide an understanding of different possible embodiments of the invention. As such, alternative ordering of the steps, performing one or more steps in parallel, and/or performing additional or fewer steps may be done in alternative embodiments of the invention.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the invention.

Memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the Internet, intranets, electronic bulletin board and message/note exchanges, telephone/modem based network communication, hard-wired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A method for computing machine translation performance, comprising:

receiving a sequence of natural language data in a first language;

translating the sequence of natural language data to a second language to define a machine translation of the sequence of natural language data comprising symbols;

receiving a reference translation of the sequence of natural language data in the second language comprising symbols;

with a computer processor, computing a sequence kernel that provides a similarity measure between the machine translation and the reference translation based on occurrences of subsequences that are shared by the machine translation and the reference translation, for a selected subsequence length, including performing an inner product in a feature space of all possible subsequences of a selected subsequence length;

outputting a signal indicating the similarity measure;

wherein the similarity measure accounts for non-contiguous occurrences of subsequences of the selected subsequence length that are shared between the machine translation and the reference translation, in which the non-contiguous subsequences share symbols and comprise a gap of at least one symbol which has been determined not to match a symbol in the gap of the other.

2. The method according to claim 1, wherein the similarity measure penalizes identified non-contiguous occurrences of subsequences shared between the machine translation and the reference translation.

3. The method according to claim 2, wherein the similarity measure penalizes identified non-contiguous occurrences of subsequences shared between the machine translation and the reference translation over a range of subsequence lengths.

4. The method according to claim 1, wherein the similarity measure scores symbols in matching subsequences in the machine translation and the reference translation with a different weight than symbols in gaps that do not match.

5. The method according to claim 1, wherein the similarity measure scores matching non-contiguous subsequences in the machine translation and the reference translation with a different weight depending on what symbol or symbols form the matching non-contiguous subsequences or exist in the gaps thereof.

6. The method according to claim 1, wherein the similarity measure scores non-matching subsequences in the machine translation and the reference translation using synonymy data.

7. The method according to claim 6, wherein the synonymy data is a collection of symbols in the second language that have similar meaning.

8. The method according to claim 1, further comprising transforming the sequence of natural language data in the first language to textual data.

9. The method according to claim 8, wherein the sequence of natural language data in the first language is voice data.

10. The method according to claim 1, wherein the reference translation of the sequence of natural language data in the first language is input by a user.

11. The method according to claim 1, further comprising computing the sequence kernel similarity measure by computing a score for every pair of symbols shared between the machine translation and the reference translation.

12. The method according to claim 11, wherein the score for every pair of symbols is computed using synonymy data.

13. The method according to claim 1, wherein the sequence kernel similarity measure is computed by representing language data using an alphabet given by one of: a set of characters, a set of syllables, a set of words, and a set of word stems.

14. The method according to claim 1, further comprising:
using a machine translator having a translation model to define the machine translation of the sequence of natural language data;
wherein the machine translator is adapted to adjust parameters of the machine translator responsive to receiving the output signal indicating the similarity measure is below a threshold performance level.

15. The method according to claim 1, further comprising using a translation model for translating the sequence of natural language data to the second language.

16. The method according to claim 15, wherein the translation model is updated using the sequence of natural language data and the reference translation in response to receiving the signal indicating the similarity measure is below a threshold performance level.

17. The method according to claim 1, wherein the sequence kernel is given by the following equation:

$$K_n(s, t) = \sum_{u \in \Sigma^n} \sum_{i:u=s[i]} \sum_{j:u=s[j]} \lambda^{l(i)+l(j)}, \text{ where}$$

$\{n \geq 2\}$: is a subsequence length,
$\Sigma$: is a finite alphabet,
$K_n$: is the measure of similarity for subsequences of length n,
s: is a first sequence of symbols of natural language data,
t: is a second sequence of symbols of natural language data,
$\{0 < \lambda \leq 1\}$: is a decay factor that accounts for matching subsequences that are noncontiguous,
l(i): is the length of the window in s spanned by s[i], and
l(j): is the length of the window in t spanned by t[j].

18. The method according to claim 1, wherein the sequence kernel is given by the following equation:

$$K_n(s, t) = \sum_{u \in \Sigma^n} \sum_{v \in \Sigma^n} \sum_{i:u=s[i]} \sum_{j:y=t[j]} \lambda_m^{2n} \prod_{k=1,\ldots,n} a_{u_k v_k} \prod_{i_1 < l < i_n, l \notin i} \lambda_{g,s_l} \prod_{j_1 < p < j_n, p \notin j} \lambda_{g,t_p}$$

$\{n \geq 2\}$: is a subsequence length,
$K_n$: is the measure of similarity for subsequences of length n,
s: is a first sequence of symbols of natural language data,
t: is a second sequence of symbols of natural language data,
$\{0 < \lambda_m \leq 1\}$: is a decay factor that accounts for symbols in matching subsequences,
$\{0 < \lambda_{g,o} \leq 1\}_{o \in \Sigma}$: is a set of decay factor that accounts for symbols in gaps of matching subsequences,
$a_{xy}$: is the similarity between any two symbols $x, y \in \Sigma$,
$\Sigma$: is a finite alphabet.

19. A method for computing machine translation performance, comprising:
receiving into computer readable memory a sequence of natural language data in a first language;
translating the sequence of natural language data to a second language to define a machine translation of the sequence of natural language data;
receiving a reference translation of the sequence of natural language data in the second language;

computing a sequence kernel that provides a similarity measure between the machine translation and the reference translation which includes performing an inner product in a feature space of all possible subsequences of a selected subsequence length;

outputting a signal indicating the similarity measure;

wherein the similarity measure accounts for non-contiguous occurrences of subsequences shared between the machine translation and the reference translation and wherein non-consecutive sequences with gaps, the gaps comprising at least one symbol, are scored differently depending on what symbol or symbols occupies the gaps.

20. A method for computing machine translation performance, comprising:

receiving a sequence of natural language data in a first language;

translating the sequence of natural language data to a second language to define a machine translation of the sequence of natural language data comprising symbols;

receiving a reference translation of the sequence of natural language data in the second language comprising symbols;

computing a sequence kernel that provides a similarity measure between the machine translation and the reference translation;

outputting a signal indicating the similarity measure;

wherein the similarity measure accounts for non-contiguous occurrences of subsequences shared between the machine translation and the reference translation, in which the non-contiguous subsequences share symbols and comprise a gap of at least one symbol which has been determined not to match a symbol in the gap of the other, and wherein the sequence kernel is given by the following equation:

$$K_n(s, t) = \sum_{u \in \Sigma^n} \sum_{i:u=s[i]} \sum_{j:u=t[j]} \prod_{1 \leq j \leq |u|} \lambda_{m,u_j}^2 \prod_{i_1 < k < i_n, k \notin i} \lambda_{g,s_k} \prod_{j_1 < l < j_n, l \notin j} \lambda_{g,t_l}$$

{n≧2}: is a subsequence length, $K_n$: is the measure of similarity for subsequences of length n, s: is a first sequence of symbols of natural language data, t: is a second sequence of symbols of natural language data, $\{0<\lambda_{m,o}\leq 1\}_{o \in \Sigma}$: is a set of decay factors that accounts for symbols in matching subsequences, $\{0<\lambda_{g,o}\leq 1\}_{o \in \Sigma}$: is a set of decay factors that accounts for symbols in gaps of matching subsequences, $\Sigma$: is a finite alphabet.

21. A system for computing machine translation performance, comprising:

means for receiving a sequence of natural language data in a first language;

means for translating the sequence of natural language data to a second language to define a machine translation of the sequence of natural language data comprising symbols;

means for receiving a reference translation of the sequence of natural language data in the second language comprising symbols;

means including a computer processor for computing a sequence kernel that provides a similarity measure between the machine translation and the reference translation which includes performing an inner product in a feature space of all possible subsequences of a selected subsequence length;

means for outputting a signal indicating the similarity measure;

wherein the similarity measure computed by said computing means accounts for non-contiguous occurrences of subsequences shared between the machine translation and the reference translation in which the non-contiguous subsequences share symbols and comprise a gap of at least one symbol which has been determined not to match a symbol in the gap of the other.

22. An article of manufacture for use in a machine comprising:

a) a memory;

b) instructions stored in the memory for a method of computing machine translation performance, the method comprising:

receiving a sequence of natural language data in a first language;

translating the sequence of natural language data to a second language to define a machine translation of the sequence of natural language data comprising symbols;

receiving a reference translation of the sequence of natural language data in the second language comprising symbols;

computing a sequence kernel that provides a similarity measure between the machine translation and the reference translation which includes performing an inner product in a feature space of all possible subsequences of a selected subsequence length;

outputting a signal indicating the similarity measure;

wherein the similarity measure accounts for non-contiguous occurrences of subsequences shared between the machine translation and the reference translation, in which the non-contiguous subsequences share symbols and comprise a gap of at least one symbol which has been determined not to match a symbol in the gap of the other.

* * * * *